United States Patent [19]

Randolph

[11] 4,206,569
[45] Jun. 10, 1980

[54] WEED SPRAYER

[76] Inventor: Joe G. Randolph, Rte. 1, Shallowater, Tex. 79363

[21] Appl. No.: 939,807

[22] Filed: Sep. 5, 1978

[51] Int. Cl.² .............................................. B05B 12/00
[52] U.S. Cl. ....................................... 47/1.7; 47/1.43; 239/170; 172/6
[58] Field of Search ............................. 47/1.43, 1.7, 1; 172/5–6; 239/78, 170; 250/223, 560

[56] References Cited

U.S. PATENT DOCUMENTS

| | | | |
|---|---|---|---|
| 1,303,798 | 5/1919 | Janes | 172/6 X |
| 2,682,132 | 6/1954 | Marihart | 47/1 |
| 2,916,633 | 12/1959 | Stone et al. | 250/560 X |
| 3,016,653 | 1/1962 | Gardner | 47/1.7 X |
| 3,111,268 | 11/1963 | Butler | 239/170 |
| 3,512,587 | 5/1970 | Shader | 172/6 X |
| 3,609,913 | 10/1971 | Rose | 47/1.43 |
| 3,959,924 | 6/1976 | Allen | 47/1.43 |
| 4,054,007 | 10/1977 | Moore | 47/1.7 |
| 4,117,888 | 10/1978 | Fuller et al. | 172/6 X |

FOREIGN PATENT DOCUMENTS 1528205  4/1968  France ........................ 47/1.43

Primary Examiner—Robert E. Bagwill
Attorney, Agent, or Firm—Wendell Coffee

[57] ABSTRACT

A tractor is equipped with a tool bar to which are attached a plurality of cultivators. Sensors are fixed by means of clamps and shanks located over the drill of the planted crop in such a manner that weeds growing above the height of the crop are detected. Once the weed is detected, a spray nozzle is activated and the weed is treated with herbicide. Weeds which are not taller than the growing crop are sprayed as the driver of the tractor manually activates spray nozzles to spray low lying weeds which he visually detects.

5 Claims, 5 Drawing Figures

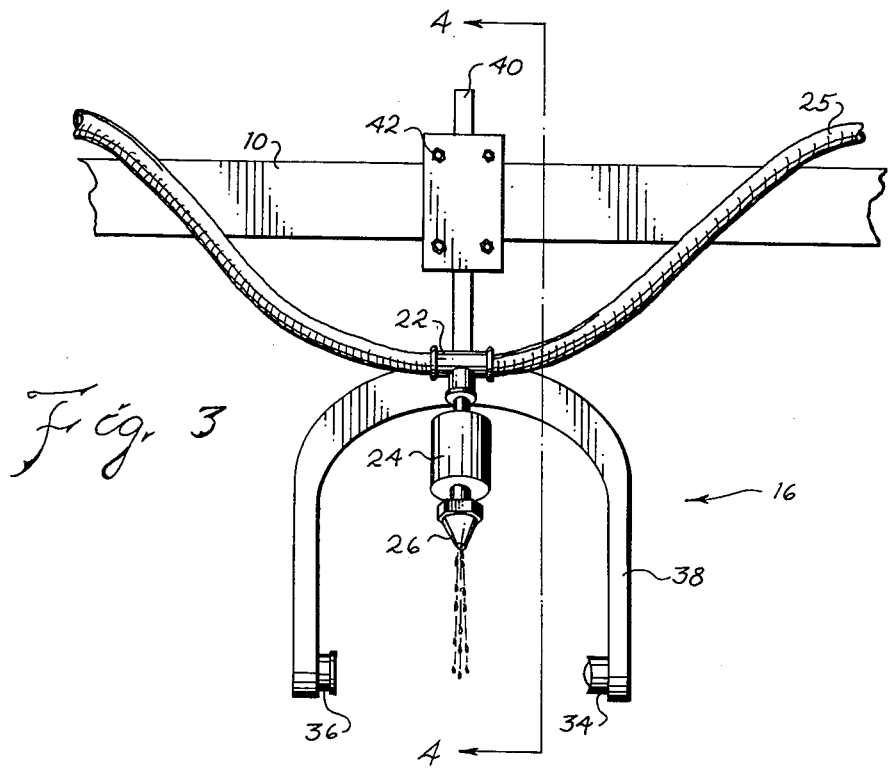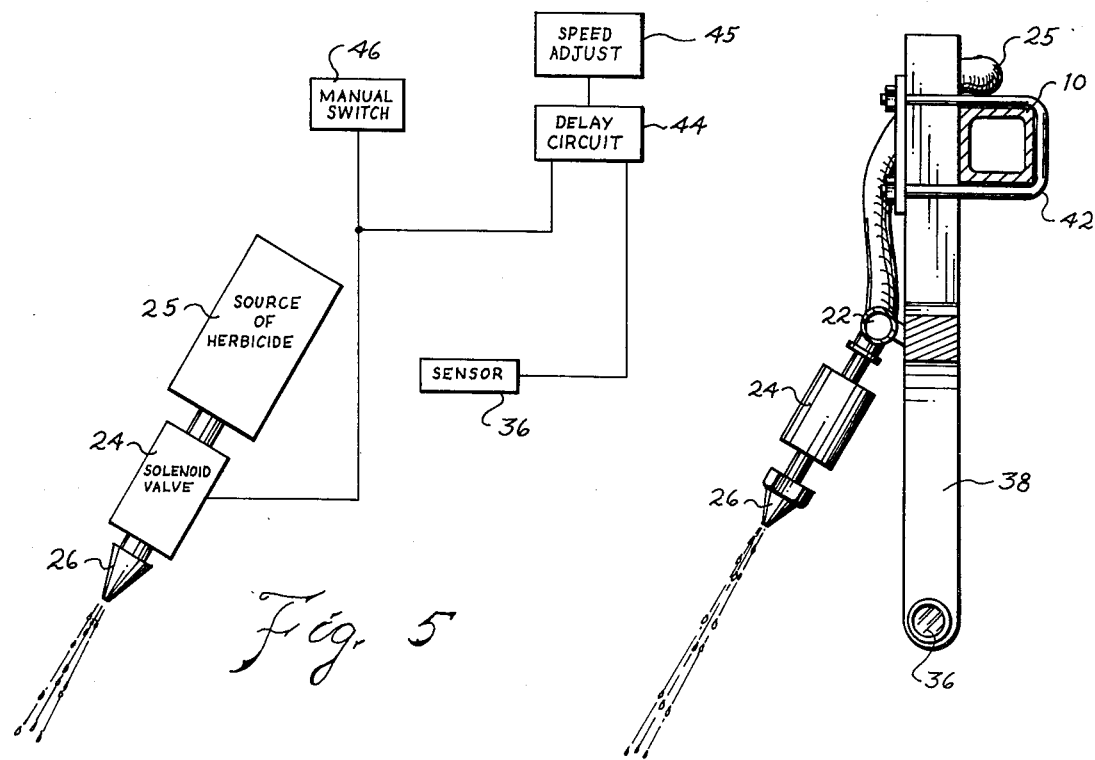

WEED SPRAYER

CROSS REFERENCE TO RELATED APPLICATIONS

None

BACKGROUND OF THE INVENTION:

(1) Field of the Invention

This invention relates to acriculture, more specifically to the distribution of herbicides by sprayers which are sensor activated.

(2) Description of the Prior Art

Weeds pose a constant problem in agriculture. Farmers find it necessary to treat fields with herbicides to try to control weeds. This practice is expensive and time consuming Previously, the control of weeds has been accomplished by hoe hands who manually chopped the weeds in a field. While this manual weed control was effective, it has, in recent years, become increasingly expensive as well as hard to find people to do this type of work.

It is increasingly the rule that farming is done by only the farmer and his sons with few, if any, other employees. For this reason, the time spent in the field is at a premium. Tractor manufacturers have developed larger and larger tractors to enable the farmer to do more work in less time. It is not uncommon for a farmer to cultivate between rows of a growing crop every week to ten days during the growing season. It is impractical on the other hand, for the farmer to treat his fields with herbicide more than once in a season. New emphasis has been placed on doing two or more jobs each time that the farmer goes through the field. To the best applicant's knowledge, however, no means for selectively spraying herbicide on weeds, relying on sensory activation of automatic spraying means is known in the prior art.

Prior to filing this application, the applicant caused a search of the prior art to be made at the United States Patent and Trademark Office. That search revealed the following patents:

| RE 26,166 | Inhofer |
|---|---|
| 3,016,653 | Gardner |
| 3,586,237 | Taylor |
| 3,609,913 | Rose |
| 3,683,547 | Harden |
| 3,866,397 | Koziol |

Koziol shows a brush eradicator which has flails to cut the brush and rubber flaps to mechanically activate sprayers. These rubber flaps are located to strike the stumps of previously cut brush.

Rose discloses the use of an electric eye to sense plants and spray herbicide thereon. No means for remote control of the spray nor cultivation is disclosed in this patent. A delay circuit is included between the sensor and the sprayer.

Gardner shows a specially designed valve which operates on a very light mechanical touch.

Harden and Inhofer disclose ways to either avoid spraying the leaves of a growing plant or to direct a spray to the leaves of a growing plant, and are of only tangential interest in this application.

Taylor shows a sprayer which may be controlled by the tractor driver.

SUMMARY OF THE INVENTION

(1) New and Different Function

I have invented a way to make the time a farmer spends in a field cultivating more productive. I have found that by locating a sensor over the drill of a growing crop slightly above the height of that crop, a farmer may automatically and selectively spray weeds while cultivating the rows between the crop. Since a farmer usually cultivates every seven to ten days, a means to accomplish the spraying of weeds at the same time constitutes a beneficial time saving.

By having sensors located above the crop and a remote control means in the cab of the tractor all weeds, even those not taller than the crop may be sprayed. As the farmer cultivates, he may see low lying weeds, or grasses not stout enough to activate the sensor, and automatically spray them by manually operating a remote control in the cab. As a crop grows, the sensors may be raised to allow continued use throughout the season.

One embodiment of my invention includes a mechanical sensor which does not rely on hinges or springs but only the resilience of the arm of the sensor. A second embodiment relies on the interruption of a beam of light. Also, my invention is simply and easily attached by a shank to a common tool bar. Clearly, maintenance of my invention is almost negligible yet its purpose is efficiently accomplished.

In other words, I have invented an efficient way for a farmer to complete two jobs at once while in the field, by means of a virtually maintenance free device which is inexpensive to manufacture and operate.

Therefore, it way be seen that the results of the combination are far greater than the sum of the functions of each of the individual parts.

(2) Objects of this Invention

An object of this invention is to detroy weeds in a field in which a row crop is growing.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 3 shows a rear elevational view of a second embodiment of my invention.

FIG. 4 is a sectional view taken along line 4—4 of FIG. 3.

FIG. 5 is a schematic representation showing an arrangement whereby sensory and manual activation are operable at the same time.

DESCRIPTION OF THE PREFERRED EMBODIMENTS

Figure 1:
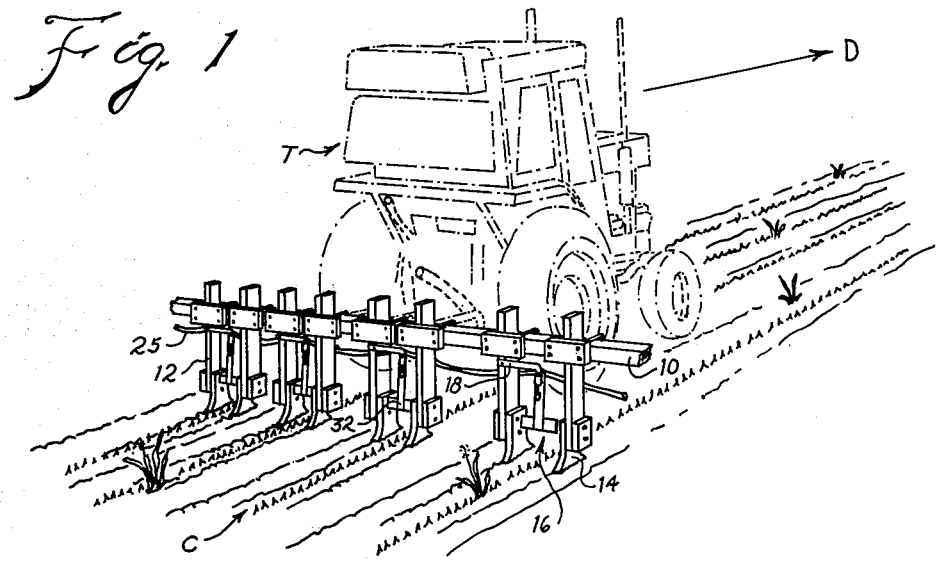
FIG. 1 is a perspective view of one embodiment of my invention.

Referring to the drawing, it may be seen that tractor T traveling in direction D is equipped with standard tool bar 10. Mounted on the tool bar 10 is a plurality of shanks 12 having cultivators 14. As shown in FIG. 1, the drawing shows cultivators for four rows of a crop C. The crop is called herein a row crop inasmuch as the crop C is planted in rows. FIG. 1 shows the tool bar broken on each end indicating that it could be extended for a six row or eight row operation. The cultivators cultivate the soil between the rows of the crop. They are spaced between the cultivators such that a growing crop is not plowed up but weeds between the rows are.

Figure 2:
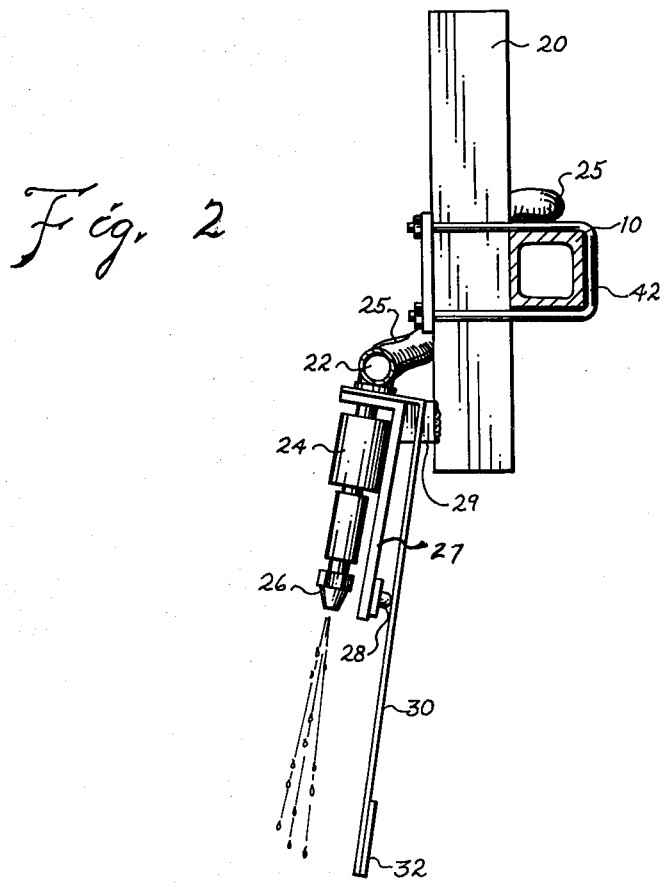
FIG. 2 is a side elevational view of a modified embodiment of my invention shown in FIG. 1.

In FIG. 1, weed sprayer 16 is mounted on the cultivator shank 12 by means of mounting bracket 18. In FIG. 2, the sprayer 16 is mounted on spray shank 20 which is attached to tool bar 10 by clamp 42. Fitting 22 connects solenoid valve 24 to hose 25, which runs along the tool bar 10 to a reservoir of herbicide (not shown for clarity). From the fitting 22, the herbicide flows into the solenoid valve 24 which, when activated, releases a spray through nozzle 26, located immediately below the solenoid valve and structurally and fluidly connected thereto. The hose 25 may be considered a source of herbicide under pressure to the valve 24.

Micro-switch 28 is located at the bottom of support arm 27 which is attached to spray shank 20 by ears 29 (FIG. 2). The micro-switch 28 is depressed by feeler arm 30 which is rigidly attached to the ears 29 and arm 27. The resilient feeler arm 30 extends down to feeler element or paddle 32. Feeler arm 30, support arm 27, solenoid valve 24 and nozzle 26 are all mounted on shank 20 so that they may be raised and lowered as a unit. It is necessary to raise the unit as the crop grows. It is the feeler paddle that actually contacts the weeds and causes the feeler arm to be moved, the micro-switch to be depressed and the weed to be sprayed. After having passed the weed the resilient feeler arm 30 returns to its normal position.

FIG. 3 shows another embodiment of my invention wherein the sensor includes an electric eye. Infra red light source 34 and light sensor 36 are placed facing one another on opposite sides of horseshoe bracket 38. The light beams height is adjusted by raising or lowering shank 40 which extends from the middle of the horseshoe bracket 38 upward through clamp 42 which is attached to the tool bar 10.

When the light beam is interrupted by a weed, a signal is sent to the solenoid valve 24. This signal, however, must first be delayed by adjustable delay means 44. This dealy adjusts the spray time to account for the nozzle 26 being behind the sensor so that the herbicide is sprayed on the weed, not behind it, and not on the electric eye apparatus. The solenoid 24 is attached to the bight of horseshoe bracket 38 by the fitting 22. The amount of delay is adjusted by the speed adjust circuits 45. Rose, U.S. Pat. No. 3,609,913, shows one example of a speed adjust circuit and other type circuits would be within the skill of those in the electronic arts.

Certain types of weeds may never grow to be taller than the crop being grown but may be detected visually by the tractor operator. When the tractor operator sees a weed which will not otherwise activate the sensor, he may activate one of switches 46 which remotely controls solenoid valve 24. There is a switch for each solenoid valve so that the tractor operator may remotely control each nozzle as necessary. The adjustable delay means 44 and remote control switches 46 form a circuit parallel to one another such that the solenoid valve may be manually operated or activated by sensory stimulation. The switches 46 are in the cab of the tractor T.

To prevent bouncing and a double depression of switch 28 after a large weed, a band or ring may be placed around the arms 27 and 30 above switch 28 to limit the distance the arm 30 may move away from the switch 28.

As an aid to correlating the terms of the claims to the exemplary drawing, the following catalog of elements is provided:

| C crop | D draft | T tractor |
|---|---|---|
| 10 tool bar | 29 ears | |
| 12 cultivator shank | 30 feeler arm | |
| 14 cultivator sweep | 32 feeler paddle | |
| 16 weed sprayer | 34 infra red light source | |
| 18 mounting bracket | 36 light screen | |
| 20 spray shank | 38 horseshoe bracket | |
| 22 fitting | 40 shank | |
| 24 solenoid valve | 42 clamp | |
| 25 hose | 44 adjustable delay means | |
| 26 nozzle | 45 speed adjust | |
| 27 support arm | 46 switch | |
| 28 micro-switch | | |

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific examples above do not point out what an infringement of this patent would be, but are to enable the reader to make and use the invention.

SUBJECT MATTER CLAIMED FOR PROTECTION

I claim as my invention:
1. In a tractor having
    a. a tool bar behind it, and
    b. a plurality of cultivators attached to the tool bar,
    c. spaces between some of the cultivator such that a growing crop is not plowed up;
the improvement comprising in combination with the above:
    d. a clamp on the tool bar at the space between cultivators above the growing crop,
    e. a spray shank adjustably clamped to the tool bar by the clamp,
    f. a flexible hose forming a source of herbicide extending along the tool bar,
    g. a solenoid valve structurally attached to the spray shank and fluidly connected to the flexible hose,
    h. a spray nozzle immediately below and structurally and fluidly connected to the solenoid valve,
    j. sensing means on the spray shank for sensing a weed above the height of the crop, and
    k. activating means interconnecting the sensing means and solenoid valve for activating the valve responsive to a weed being sensed.
2. The invention as defined in claim 1 wherein
    m. the sensor means is a mechanical sensor including
        (i) a resilient arm rigidly connected to the spray shank with

(ii) a feeler element attached to the lower end of the arm, n. a switch adjacent the arm which is depressed by the resilient arm when the feeler element encounters a weed above the height of the crop, and o. said switch is a portion of the activating means.

3. The invention as defined in claim 1 further comprising:

m. a plurality of manually operated electrical switches; and n. each switch controls one of a plurality of said solenoid valves, o. each of said manual switches is parallel to the activating means such that an operator may manually operate the solenoid valve at any point, to spray a weed which does not extend above the crop.

4. The invention as defined in claim 3 wherein p. the sensor means is a mechanical sensor including (i) a resilient arm rigidly connected to the spray shank with (ii) a feeler element attached to the lower end of the arm, q. a switch adjacent the arm which is depressed by the resilient arm when the feeler element encounters a weed above the height of the crop, and r. said switch is a portion of the activating means.

5. The method of killing weeds in a field planted with a row crop comprising the steps of:

a. cultivating the soil between the rows of crop to kill the weeds while, b. automatically sensing weeds in the crop row above the height of the crop, c. spraying the sensed weeds responsive to sensing while, d. visually sighting weeds in the crop row, and e. spraying the sighted weeds f. by activating manually the spray nozzle used to spray the sensed weeds.

* * * * *